(12) United States Patent
Zinbo et al.

(10) Patent No.: US 6,607,807 B2
(45) Date of Patent: Aug. 19, 2003

(54) FERROMAGNETIC METAL POWDER AND MAGNETIC RECORDING MEDIUM USING THE SAME

(75) Inventors: Noboru Zinbo, Kanagawa (JP); Toshihiko Miura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 109 days.

(21) Appl. No.: 09/737,569

(22) Filed: Dec. 18, 2000

(65) Prior Publication Data
US 2001/0007721 A1 Jul. 12, 2001

(30) Foreign Application Priority Data
Dec. 17, 1999 (JP) ........................................ P. 11-359326

(51) Int. Cl.$^7$ ............................................... G11B 5/706
(52) U.S. Cl. ...................... 428/141; 428/328; 428/329; 428/403; 428/694 BA; 428/694 BS
(58) Field of Search ................................. 428/141, 328, 428/329, 403, 694 BA, 694 BS, 900

(56) References Cited

U.S. PATENT DOCUMENTS

| 4,318,735 A | 3/1982 | Mishima et al. |
| 4,554,089 A | 11/1985 | Umemura et al. |
| 5,540,975 A | 7/1996 | Masaki et al. |
| 5,735,969 A | 4/1998 | Lown et al. |
| 5,770,302 A | 6/1998 | Masaki et al. |
| 5,789,063 A | 8/1998 | Ishikawa et al. |

FOREIGN PATENT DOCUMENTS

| DE | 197 17 560 A1 | 10/1997 |
| EP | 0 367 159 A2 | 5/1990 |
| EP | 0 640 958 A1 | 3/1995 |
| EP | 0 768 644 B1 | 4/1997 |
| EP | 0 999 185 A1 | 5/2000 |
| JP | A-7-326035 | 12/1995 |
| JP | A-9-91684 | 4/1997 |
| JP | A-9-106535 | 4/1997 |

OTHER PUBLICATIONS

The Structure and Magnetic Properties of Metal Particles for Advanced Thin Layer Metal Particulate Media, Kouichi Masaki and Toshihiko Miura, pp. 961–965 (1996).
Kishimoto et al, Morphology and Magnetic Properties of the Iron Oxide Layer Formed on Iron Acicular Particles (IEEE Transactions on Magnetics, vol. MAG–22, No. 5), pp. 732–734 (1986).
Makishima et al, Characterization of the Surface Oxide Layer on Iron Particles for Magnetic Recording by Mossbauer Spectrometry, Bull. Chem. Soc., Jpn., 63, 147–150 (1990).
Kitahata et al, Mossbauer Study of the Oxides Layer Formed on the Surface of Acicular Iron Particles, IEEE Transactions on Magnetics, vol. MAG–23, No. 5, pp. 2818–2819 (1987).
Patent Abstracts of Japan (JP–3–171601).
European Search Report+.

*Primary Examiner*—Stevan A. Resan
(74) *Attorney, Agent, or Firm*—Sughrue Mion, PLLC

(57) ABSTRACT

A ferromagnetic metal powder comprises: a metal portion comprising Fe; and an oxide layer around the metal portion, wherein the oxide layer comprises an iron oxide having magnetism such that the saturation magnetization is from 50 to 95 A.m$^2$/kg.

14 Claims, No Drawings

FERROMAGNETIC METAL POWDER AND MAGNETIC RECORDING MEDIUM USING THE SAME

BACKGROUND OF THE INVENTION

1. Field of the Invention

The present invention relates to a ferromagnetic metal powder and a magnetic recording medium comprising the powder, more specifically, the present invention relates to a magnetic recording medium comprising a support having thereon a magnetic layer comprising a ferromagnetic fine powder dispersed in a binder, which is obtained by coating a magnetic coating material mainly comprising a ferromagnetic metal powder and a binder on a support to form a magnetic layer, which ensures high output in the short wavelength region, excellent C/N and overwrite properties, and good storability.

2. Background Art

The magnetic recording techniques are being widely used in various fields including uses in video, audio, computer and the like because of excellent properties not available in other recording systems, for example, the medium can be repeatedly used, the signals can be easily converted into electrons, thereby enabling construction of a system combined with peripheral equipment, and the signals can also be easily corrected.

To satisfy the requirements for downsizing of the equipment, improvement on the quality of recording and reproducing signals, prolongation of the recording time, increase in the recording capacity and the like, the recording medium is always demanded to make more improvements on the recording density, reliability and durability.

For example, in the field of audio and video, implementation of a digital recording system capable of realizing improvements of tone quality and image quality and development of a recording system respondent to hi-vision TV are proceeding and to cope with use in these systems, the magnetic recording medium is required to have capability of recording and reproducing signals in a wavelength region shorter than in conventional systems and at the same time, to ensure high reliability and excellent durability even with increase in the relative speed between the head and the medium. In the use for computer, a digital recording medium having a large capacity is being demanded so as to store increasing data.

In order to attain high-density recording of a magnetic recording medium comprising a support having thereon a magnetic layer comprising a ferromagnetic fine powder dispersed in a binder, various methods have been studied and proposed from the standpoint of improving the magnetic properties of the magnetic layer, the dispersibility of ferromagnetic powder and the surface property of the magnetic layer, for example, proposals have been made to use an alloy magnetic powder comprising iron or mainly comprising iron, in place of conventionally used magnetic iron oxide powder, to improve the magnetic substance, such as more reduction in the size of magnetic powder, or to improve the filling and orienting properties of the magnetic substance.

More specifically, for example, a method of using ferromagnetic metal powder or hexagonal system ferrite as the ferromagnetic powder so as to elevate the magnetic properties is disclosed in JP-A-58-122623 (the term "JP-A" as used herein means an "unexamined published Japanese patent application"), JP-A-61-74137, JP-B-62-49656 (the term "JP-B" as used herein means an "examined Japanese patent publication"), JP-B-60-50323 and U.S. Pat. Nos. 4,629,653, 4,666,770 and 4,543,198.

JP-A-1-18961 discloses a magnetic metal powder having a long axis size of 0.05 to 0.2 $\mu$m and an axial ratio of 4 to 8, which is a ferromagnetic powder having a specific surface area of 30 to 55 m$^2$/g, a coercivity of 1,300 Oe (1.03×10$^5$ A/m) or more and a saturation magnetization quantity of 120 A.m$^2$/kg or more, thereby attaining an object of providing a fine metal powder having a small specific surface area. JP-A-60-11300 and JP-A-60-21307 disclose a method for producing a fine iron $\alpha$-oxyhydroxide acicular crystal suitable for ferromagnetic powder, particularly ferromagnetic metal powder, and the latter discloses that a ferromagnetic powder having an Hc of 1,450 to 1,600 Oe {(1.15 to 1.27)×10$^5$ a/m} and a $\sigma$s of 142 to 155 A.m$^2$/kg is produced from goethite having a long axis length of 0.12 to 0.25 $\mu$m and an axial ratio of 6 to 8. JP-A-9-91684 proposes to use ferromagnetic metal particles in which ferromagnetic metal particles having an average long axis length of 0.05 to 0.12 $\mu$m and an acicular ratio of 8 or more occupy 5.0% or less of the entire ferromagnetic metal particles or in which ferromagnetic metal particles comprising a crystallite having an acicular ratio of 4 or more occupy 17.0% or less of the entire ferromagnetic metal particles.

JP-A-6-340426 and JP-A-7-109122 disclose monodisperse spindle-shaped hematite particles using hematite core crystal, iron oxide and specific ion and also disclose a very fine ferromagnetic powder obtained by reducing the hematite particles.

Furthermore, in order to elevate the monodispersivity of ferromagnetic powder, use of various surfactants (disclosed, for example, in JP-A-52-156606, JP-A-53-15803 and JP-A-53-116114) or use of various reactive coupling agents (disclosed, for example, in JP-A-49-59608, JP-A-56-58135 and JP-B-62-28489) is proposed.

JP-A-1-239819 discloses a magnetic powder obtained by covering the surface of a magnetic iron oxide particle in sequence with a boron compound and an aluminum compound or with a boron compound, an aluminum compound and a silicon compound, where the magnetic properties and dispersivity are improved. Also, JP-A-7-22224 discloses a ferromagnetic metal powder containing a Group 1a element of the Periodic Table in an amount of 0.05 mass % or less, which contains, if desired, from 0.1 to 30 atm % of aluminum and further from 0.1 to 10 atm % of a rare earth element, based on the total weight of metal elements and in which the residual amount of Group 2a element of the Periodic Table is 0.1 mass % or less, wherein a high-density magnetic recording medium having good storage stability and high magnetic properties can be obtained.

For improving the surface properties of the magnetic layer, a method of improving the surface formation treatment of the magnetic layer after the coating and drying is proposed (disclosed, for example, in JP-B-60-44725).

In order to achieve high recording density of the magnetic recording medium, use of signals in the shorter wavelength region is being aggressively studied. If the length of region for recording signals is increased to a size comparable to the size of the magnetic substance used, a clear magnetization and transition state cannot be created and the recording becomes substantially impossible. To overcome this, a magnetic substance having a particle size sufficiently small to the shortest wavelength used must be developed and studies are long directed toward the reduction in the particle size of the magnetic substance.

The metal powder for magnetic recording is formed to have an acicular (needle-like) particle shape so as to impart shape anisotropy and thereby obtain the objective coercivity. It is well known to one skilled in the art that for the purpose of attaining high-density recording, the ferromagnetic metal powder must be formed to have a small size and thereby the medium obtained must be reduced in the surface roughness. However, as the particle size becomes smaller, the metal powder for magnetic recording decreases in the acicular ratio and cannot have a desired coercivity. In recent years, a DVC system of performing the recording by digitizing video signals has been proposed and for this system, a high-performance ME tape or a high-performance MP tape is used. The MP tape used for DVC has a coercivity of 2,000 Oe ($1.59 \times 10^5$ A/m) or more, therefore, a ferromagnetic metal powder having a large coercivity, a small particle size and an excellent particle distribution is necessary. Furthermore, since this system is a recording method of overwriting the signals, good overwriting properties are demanded.

JP-A-7-326035 proposed a ferromagnetic metal powder suitable for the DVC system and a magnetic recording medium using the metal powder. This previously filed invention provides a magnetic recording medium in which the magnetic layer is controlled to a coercivity of 2,000 to 3,000 Oe $\{(1.59 \text{ to } 2.39) \times 10^5 \text{ A/m}\}$, a thickness of 0.05 to 0.3 µm and a surface roughness of 1 to 3 nm, and a specific magnetization reversal component ratio is used.

When the particle size of ferromagnetic metal powder is more reduced, there arises a problem that two requirements to acquire desired magnetic properties and ensure powder storability in aging cannot be achieved at the same time.

The present invention has been made as a series of the above-described previous application with an attempt to provide means for more improving capability and uniformity in quality of the ferromagnetic metal powder and the magnetic recording medium.

SUMMARY OF THE INVENTION

The present invention has been made by taking account of the above-described problems encountered in techniques of the related art and an object of the present invention is to provide a ferromagnetic metal powder having high output at short wavelength, good S/N, excellent overwrite properties and superior storability with reduced demagnetization even under a high-temperature and high-humidity environment, and being applicable to a high-density digital recording system, and also provide a magnetic recording medium using the ferromagnetic metal powder.

The objects of the present invention can be attained by the following constructions.

(1) A ferromagnetic metal powder comprising a metal portion comprising Fe or Fe—Co and an oxide layer present in the periphery thereof, wherein an iron oxide having magnetism such that the saturation magnetization is from 50 to 95 A.m²/kg is present in the oxide layer.

(2) The ferromagnetic metal powder as described in (1) above, wherein a nonmagnetic oxide is present in the oxide layer.

(3) The ferromagnetic metal powder as described in (1) or (2) above, wherein the ferromagnetic metal powder comprising the metal portion and the oxide layer has a coercivity Hc of 1,700 to 3,500 Oe $\{(1.35 \text{ to } 2.79) \times 10^5 \text{ A/m}\}$ and a saturation magnetization σs of 100 to 180 A.m²/kg.

(4) The ferromagnetic metal powder as described in any one of (1) to (3) above, wherein the Co content of the ferromagnetic powder is from 10 to 50 atm % based on Fe contained in the ferromagnetic powder.

(5) A magnetic recording medium comprising a support having provided thereon a magnetic layer comprising a ferromagnetic metal powder described in any one of (1) to (4) above and a binder.

(6) The magnetic recording medium as described in (5) above, wherein a nonmagnetic layer comprising a nonmagnetic powder and a binder resin is provided between the support and the magnetic layer, the thickness of the magnetic layer is from 0.01 to 0.5 µm, and the central plane average surface roughness (SRa) of the magnetic layer is 3.0 nm or less by the measurement with an optical profiler: TOPO-3D.

DETAILED DESCRIPTION OF THE INVENTION

In the present invention, the metal portion of the ferromagnetic metal powder comprises a metal crystallite. The metal portion of the ferromagnetic metal powder usually comprises from 1 to a few metal crystallites, preferably one crystallite, namely, single crystallite. In the case where a plurality of crystallites are present, the metal portion is the portion containing the plurality of crystallites.

The oxide layer of the ferromagnetic metal powder of the present invention comprises as a constituent element an iron oxide having at least such magnetism that the saturation magnetization is from 50 to 95 A.m²/kg, but a nonmagnetic oxide may further be present in the layer. In the oxide layer, a slight amount of metal element, for example, a metal such as Al, Mg, Si, Y, rare earth element, Ca, Ba, Si and Ni, may be solid-solved as long as the saturation magnetization is from 50 to 95 A.m²/kg.

Examples of the iron oxide having magnetism include $Co_xFe_{(1-x)}O_y$ (e.g., $CoFe_2O_4$, $CoFe_3O_4$) and $FeO_x$ (wherein x satisfies the relationship of $1.33 \leq x \leq 2$; e.g., $\gamma Fe_2O_3$, $Fe_3O_4$, Berthollide compound).

The nonmagnetic oxide includes crystalline or amorphous non-crystalline metal oxides, and single or composite products containing oxyhydroxide, hydroxide or hydrate oxide. The nonmagnetic oxide is derived mainly from an element added as a sintering inhibitor, and an element added at the production of the starting material for ferromagnetic powder.

The oxide layer is not particularly limited on the structure as long as an iron oxide is present, but for example, the oxide layer is constituted by an iron oxide alone or a combination of an iron oxide and a nonmagnetic oxide. In the case where the oxide layer is constituted by a combination of an iron oxide and a nonmagnetic oxide, the magnetic oxide and the nonmagnetic oxide may be intermingled with each other or may form layers independent of each other.

When the oxide layer is provided on the metal portion, the metal phase and the iron oxide phase, and the nonmagnetic oxide phase and the iron oxide phase, at the interface between the oxide layer and the metal portion may be intermingled.

In the present invention, the iron oxide layer and the nonmagnetic oxide layer are preferably formed in sequence toward the grain surface direction in the periphery of the metal portion, whereby the crystallinity of the iron oxide can be controlled to be high.

In the present invention, the ratio in volume of the metal portion is usually from 20 to 96% by volume, preferably from 30 to 90% by volume, more preferably from 40 to 90% by volume, per one particle. The ratio volume of the magnetic oxide layer is usually from 2 to 70% by volume, preferably from 10 to 65% by volume, more preferably from 15 to 60% by volume, per one particle. The ratio in volume of the nonmagnetic oxide layer is usually from 0 to 50% by volume, preferably from 0 to 40% by volume, more preferably from 0 to 20% by volume, per one particle.

The crystallinity in the constituent moieties of the ferromagnetic metal powder can be analyzed by a transmission electron microscope or a crystal structure analyzer such as X-ray diffraction. A combination use with an analyzer capable of analysis in the depth direction, such as ESCA, AMF and Auger, also useful.

The present invention provides a ferromagnetic metal powder having the above-described specific magnetic structure and properties, and a magnetic recording medium using the ferromagnetic metal powder, where a high-crystallinity iron oxide having magnetism is provided in the ferromagnetic metal powder, and by controlling the crystallinity of this iron oxide to be high, the ferromagnetic powder and the magnetic recording medium can be reduced in the particle size and in the demagnetization during storage in a high-temperature and high-humidity environment (storage at 60° C. and 90% RH for 1 week) and at the same time, favored with high coercivity, small Hc distribution, high output, high C/N and excellent overwrite properties.

The present invention is suitable for a magneto-resistive (MR) head-mounted system where low noise and high Hc are required.

The ferromagnetic metal powder of the present invention preferably has a saturation magnetization of 100 to 180 $A.m^2/kg$, more preferably from 120 to 170 $A.m^2/g$. Here, it is effective to treat, immediately after the reduction, the powder with a compound described in JP-A-61-52327 and JP-A-7-9310 or with a coupling agent having various substituents and then gradually oxidize it, because the saturation magnetization of the ferromagnetic metal powder can be increased.

The coercivity of the ferromagnetic metal powder is preferably 1,700 to 3,500 Oe $\{(1.35 \text{ to } 2.79) \times 10^5 \text{ A/m}\}$, more preferably from 1,800 to 3,500 Oe $\{(1.43 \text{ to } 2.79) \times 10^5 \text{ A/m}\}$. The present inventors assume that since the magnetism of the oxide layer in the periphery of the metal portion of the ferromagnetic metal powder is specified as described above, the ferromagnetic metal powder obtained can be reduced in the particle size and in the demagnetization during storage in a high-temperature and high-humidity environment (storage at 60° C. and 90% RH for 1 week) and at the same time, favored with high coercivity, small Hc distribution, high output, high C/N and excellent overwrite properties.

In the present invention, the magnetic layer usually has a coercivity Hc of 1,700 to 3,500 Oe $\{(1.35 \text{ to } 2.79) \times 10^5 \text{ A/m}\}$, preferably from 1,800 to 3,500 Oe $\{(1.43 \text{ to } 2.79) \times 10^5 \text{ A/m}\}$, more preferably from 2,200 to 3,500 Oe $\{(1.75 \text{ to } 2.79) \times 10^5 \text{ A/m}\}$. The Bm (maximum magnetic flux density) of the magnetic layer is usually from 0.3 to 0.8 T (tesla), preferably from 0.35 to 0.8 T. If the Hc and the Bm are less than respective lower limits, short-wavelength output cannot be satisfactorily obtained, whereas if these exceed respective upper limits, the head used for the recording and/or reproduction is saturated, and a sufficiently high output cannot be ensured.

In the present invention, the metal portion of the ferromagnetic powder indicates, on the observation of a lattice image of the ferromagnetic metal powder through a high-resolution transmission electron microscope, a portion comprising crystallites, obtained by excluding the metal oxide layer present in the periphery of the metal portion occupying the inside of the ferromagnetic metal powder, from the entire ferromagnetic metal powder.

The metal portion is regarded as an independent powder body and is specified in the size similarly to the powder. The average long diameter of the metal portion indicates an average of the lengths of long axes constituting the metal portion, the average short diameter of the metal portion indicates an average of the lengths of the short axes in the metal portion, and the average acicular ratio of the metal portion indicates an average value of acicular ratios (long diameter/short diameter). The coefficient of variation of the acicular ratio indicates a value in % resulting from dividing the standard deviation of the acicular ratio by the average acicular ratio. The coefficient of variation of the long diameter indicates a value in % resulting from dividing the standard deviation of the long diameter by the average long diameter. The coefficient of variation of the short diameter indicates a value in % resulting from dividing the standard deviation of the short diameter by the average short diameter. These specific sizes can apply for the ferromagnetic particle as a whole. These statistics are obtained using about 500 samples. The above-described specific sizes also apply for other needle-like powders.

The method for measuring the samples is specifically described below.

A photograph of particles is taken by a high-resolution transmission electron microscope, each ferromagnetic particle on the obtained photograph by the high-resolution electron microscope is contoured by an image analyzer, and the long diameter, short diameter and acicular ratio (long diameter/short diameter) are determined. Furthermore, the oxide layer is photographed by a high-resolution transmission electron microscope, the oxide layer of each ferromagnetic metal particle on the obtained photograph by the high-resolution electron is contoured by an image analyzer, and the thickness of the oxide layer of the ferromagnetic metal powder is measured. The long diameter, short diameter and acicular ratio (long diameter/short diameter) of the ferromagnetic metal powder are determined by subtracting the thickness of the oxide layer from the long diameter, short diameter and acicular ratio (long diameter/short diameter) of the ferromagnetic metal powder.

In the present invention, the average long diameter of the metal portion of the ferromagnetic metal powder is preferably from 25 to 120 nm, more preferably from 35 to 110 nm, so as to reduce the surface roughness of the magnetic recording medium. The average acicular ratio of the metal portion of the ferromagnetic metal powder is preferably from 3 to 12.

If the average long diameter of the metal portion of the ferromagnetic metal powder is less than 25 nm, the objective coercivity can be hardly obtained and furthermore, high saturation magnetization necessary for high-density recording cannot be easily ensured due to the effect of the oxide film formed for the purpose of stabilization. If the average long diameter of the metal portion of the ferromagnetic metal powder exceeds 120 nm, the reproduction loss regarding the long diameter of the ferromagnetic metal powder increases and at the same time, the medium noise increases, failing in obtaining excellent S/N.

If the average acicular ratio of the metal portion of the ferromagnetic powder is less than 3, the coercivity Hc based on the shape anisotropy decreases and this is disadvantageous to the high-density recording.

When the average acicular ratio of the metal portion of the ferromagnetic powder is in the range from 3 to 12, as the average acicular ratio is larger, the coercivity Hc is higher.

The coefficients of variation of the long diameter and the acicular ratio of the metal portion each is preferably smaller. When the coefficients of variation of the long diameter and the acicular ratio are small, the Hc distribution is small and in particular, the r3000/Hc (=the ratio of components which undergo magnetization reversal at Hc of 3,000 Oe ($2.387 \times 10^5$ A/m) or more/Hc) decreases and this is preferred in view of overwrite properties. It is verified that when the coefficients of variation of the long diameter and the acicular ratio are small, there is a tendency that the Hc is high, the Hc distribution is small, the high coercivity components are reduced and the SFD decreases.

In the present invention, even with a conventional ferromagnetic metal powder, particularly a fine ferromagnetic metal powder of 100 nm or less, which is difficult to increase in the coercivity and to reduce in the high coercivity components, by forming it into a ferromagnetic metal powder having a structure where an oxide layer containing a high-crystallinity iron oxide having magnetism is provided, high σs, reduced desensitization during storage in a high-temperature and high humidity environment (storage at 60° C. and 90% RH for 1 week), high coercivity and improved Hc distribution can be attained.

It is considered that in the techniques of the related art, since the control of the shape of the metal portion, the control of crystallinity of the metal portion and the control of crystallinity of the oxide layer are insufficient, the ferromagnetic metal powder obtained suffers from low σs, large desensitization during storage in a high-temperature and high humidity environment (storage at 60° C. and 90% RH for 1 week) and insufficient improvement on the Hc elevation and the Hc distribution.

In the present invention, the method for controlling the ferromagnetic metal powder is not particularly limited but preferred examples thereof include the following methods. When a starting material uniform in the long diameter, the acicular ratio and the particle size is used and subjected to a sintering inhibition treatment and then to reduction, the acicular ratio of the metal (e.g., Fe) can be controlled from the metal oxide (e.g., $FeO_x$: $1 \leq x \leq 1.5$, e.g., $Fe_2O_3$, $Fe_3O_4$). Examples of the starting material include monodisperse goethite and monodisperse hematite.

The starting material preferably has an average long diameter of 40 to 140 nm and an acicular ratio of 3 to 15. It is important to make uniform the shape, long diameter, short axis length and acicular ratio of the starting material.

If the starting material used has an average long diameter of less than 40 nm, the Hc and σs within the objective range cannot be obtained, whereas if the starting material used has an average long diameter in excess of 140 nm, the surface roughness of the recording medium increases, the noise becomes large and an excellent S/N cannot be obtained. If the acicular ratio exceeds 15, Bm of the recording medium decreases, high coercive components increase and overwrite properties become poor, whereas if the acicular ratio is less than 3, the ferromagnetic metal powder obtained is low in the coercivity and cannot be used in the medium for high-density recording.

In addition, the means for controlling the ferromagnetic metal powder includes the following methods (1) and (2):

(1) to specify mainly the elemental composition in the inside of the ferromagnetic powder; particularly, in the case of a ferromagnetic metal powder mainly comprising Fe, the trace elements which interact with Fe are specified; the trace elements are preferably Ca, Mg, Co, Ni Cr and the like; this trace element is preferably added at the time of preparing goethite or hematite and/or by a surface treatment after the preparation; and (2) in the case of a technique of forming a ferromagnetic powder by reducing an oxide of ferromagnetic metal element, to select the pretreatment conditions before the reduction, for example, dehydration conditions, annealing conditions and the like of goethite, and the reduction conditions such as temperature, reducing gas and reduction treatment time.

In particular, it is very important to make uniform the shape and the long and short diameters of the metal portion and at the same time uniformly maintain the form and the large acicular ratio of 3 to 12 by stepwise and repeatedly performing the reduction treatment and gradual oxidization treatment, and thereby to control the shape and crystallinity of the metal portion and the thickness and crystallinity of the oxide layer.

The conditions in treating the trace element-containing goethite obtained in (1) are specifically described below. With respect to the dehydration conditions, the treatment is performed in a rotary electric furnace in a nitrogen atmosphere usually at 250 to 400° C., preferably 300 to 400° C., for 0.5 to 2 hours, preferably 0.5 to 1 hour. With respect to the annealing conditions, the treatment is performed in a standing reducing furnace in a nitrogen atmosphere usually at 500 to 800° C., preferably 550 to 700° C., for 1 to 5 hours, preferably 2 to 3 hours. After the dehydration, a step of water washing the hematite obtained by the dehydration treatment to remove soluble alkali metal may be provided before the annealing treatment. It is effective, for example, to repeatedly perform the dehydration, annealing and gradual oxidation treatments while stepwise elevating the temperature from a low temperature gradually to a higher temperature, preferably under the dehydration conditions of 250 to 300° C. at the beginning, subsequently from 300 to 350° C. and thereafter from 350 to 400° C., and the annealing conditions of 500 to 550° C. at the beginning, subsequently 550 to 650° C. and thereafter 600 to 800° C., and thereby control the shape and crystallinity of the metal portion and the thickness and crystallinity of the oxide layer.

The reduction conditions are such that the reduction is performed in a standing reducing furnace in a hydrogen atmosphere at a temperature of usually from 350 to 600° C., preferably from 425 to 530° C., for a reduction time of usually from 0.25 to 1 hour, preferably from 0.25 to 0.5 times, subsequently, after displacing the atmosphere by nitrogen, the heating is performed at a temperature of usually from 450 to 650° C., preferably from 500 to 600° C., for a heating time of usually from 0.5 to 3 hours, preferably from 1 to 2 hours, and thereafter, by switching to pure hydrogen, the reduction is performed at the above-described temperatures for 3 to 5 hours. It is very effective to stepwise and repeatedly perform the reduction treatment, for example, from a lower temperature gradually to a higher temperature, preferably at 350 to 470° C. at the initial stage of reduction, subsequently 370 to 620° C., and thereafter 450 to 620° C. (at the same time while elevating the temperature by 10° C. or more in each step), and thereby to control the shape of the metal portion and elevate the crystallinity.

The termination of reduction is determined by measuring the water content of a gas in the drainage system using a dew-point instrument. In the above-described production process of the ferromagnetic metal powder, a known method, for example, a method described in JP-A-7-109122 and JP-A-6-340426 may be applied. The ferromagnetic metal element in the metal portion of the ferromagnetic metal powder comprises Fe or Fe-Co as the main component. The term "main component" as used herein means that the component occupies 75% by mass or more in the total mass of the metal portion. Among those, Co is preferred because it can increase the σs and form a dense and thin oxide film.

The Co content of the ferromagnetic metal powder is preferably from 10 to 50 atm %, more preferably from 15 to 40 atm %, based on Fe contained in the ferromagnetic metal powder. As described above, it is preferred to add Co to the starting material by doping a part into a starting material and adhering a necessary amount to the surface, and then form an alloy by the reduction.

The ferromagnetic metal powder which can be used in the present invention preferably contains, in addition to Fe and Co, an atom such as Al, Si, S, Ti, V, Cr, Cu, Y, Mo, Rh, Pd, Ag, Sn, Sb, Te, Sr, W, Au, Pb, Bi, La, Ce, Pr, Nd, P, Mn, Zn, Sr, B and Ca, in a ratio of 20% by mass or less. Such an element is effective not only in the control of the shape of the starting material but also in the prevention of sintering among particles, promotion of the reduction, control of the shape of the reduced ferromagnetic metal powder, and control of asperities on the particle surface.

In order to finally reduce the monodisperse goethite or monodisperse hematite into a metal, the powder is reduced with pure hydrogen. On the way to this final stage, the powder may be annealed with $\alpha Fe_3O_3$ and this is useful so as to increase the crystal ratio. In the reduction from $\alpha Fe_2O_3$ into $Fe_3O_4$ or FeO, various reducing gases may be used in place of pure hydrogen. Water is known to have a relation with the sintering at the reduction, therefore, the product nucleus is preferably controlled to one nucleus as much as possible and in order to increase the crystal ratio, the water generated by the reduction is preferably removed out of the system within a short time or the amount of water generated by the reduction is preferably controlled. The control of water can be attained by controlling the partial pressure of the reducing gas or controlling the amount of the reducing gas.

The oxide layer of the ferromagnetic metal powder of the present invention can be formed in the periphery of the metal portion by a known oxidation method, for example, by the above-described gradual oxidation treatment, after the formation of the metal portion. The gas used at the gradual oxidation may contain carbonic acid gas, because the carbonic acid gas adsorbs to the basic point on the surface of the ferromagnetic metal powder.

The ferromagnetic metal powder is heretofore produced starting from goethite ($\alpha$-FeOOH) or hematite ($\alpha$-$Fe_2O_3$) and attributably to the size or form of the starting material, the particle has a large outer size. That is, the ferromagnetic metal powder had an average long diameter of approximately from 0.2 to 0.3 μm.

At the same time with deoxidation and reduction into a ferromagnetic metal powder, the outer form of the particle shrinks and in conventional ferromagnetic particle, a polycrystalline crystal full of empty spaces is obtained. In the present invention, the coefficient of variation of the size or form of the starting material, particularly, the coefficients of variation of the long diameter and the acicular ratio are made small, so that the metal portion of the ferromagnetic metal particle can be controlled in the long diameter, short diameter and acicular ratio and can be reduced in the size and the coefficient of variation, the metal portion having a single crystal structure can be increased as much as possible from the conventional polycrystalline metal portion and at the same time, the crystallinity of the oxide layer having magnetism present in the periphery of the metal portion can be improved.

Before the dispersion, the ferromagnetic metal powder may be previously treated with a dispersant, a lubricant, a surfactant, an antistatic agent or the like which are described later. These are described more specifically, for example, in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005 and 3,389,014.

The moisture content of the ferromagnetic metal powder is preferably 0.01 to 2% by mass. The moisture content is preferably optimized by selecting the kind of a binder which is described later.

The tap density of the ferromagnetic metal powder is preferably from 0.2 to 0.8 g/ml. If the tap density exceeds 0.8 g/ml, the gradual oxidization of the powder cannot proceed uniformly and the powder becomes difficult of safe handling or the tape obtained diminishes in the magnetism with the passage of time, whereas if the tap density is less than 0.2 g/ml, insufficient dispersion may result.

The magnetic recording medium of the present invention fundamentally comprises a support having provided thereon a magnetic layer containing the ferromagnetic metal powder of the present invention and the layer structure thereof is not particularly limited as long as the magnetic layer is provided on one side or both sides of the support.

The magnetic layer may consist of a single layer or may consist of two or more layers. In the latter case, the layers may have a positional relation employed in a known layer structure, for example, these layers may be provided adjacent to each other or a layer other than a magnetic layer may be interposed therebetween. Incidentally, the thickness of the magnetic layer as used in the present invention means a dry thickness of, in the case of a multilayer structure, the outermost magnetic layer.

In the magnetic recording medium of the present invention, a nonmagnetic layer mainly comprising a nonmagnetic powder and a binder is preferably provided between the support and the magnetic layer. In this case, the thickness of the magnetic layer is preferably from 0.01 to 0.5 μm, more preferably from 0.05 to 0.4 μm. The surface roughness of the magnetic layer is, in terms of the center plane average surface roughness measured with an optical profiler: TOPO-3D, preferably 3.0 nm or less, more preferably from 1.0 to 2.8 μm.

Examples of the magnetic layer consisting of a plurality of layers include a combination with a magnetic layer comprising a binder having dispersed therein a ferromagnetic powder selected from ferromagnetic iron oxide, ferromagnetic cobalt-modified iron oxide, $CrO_2$ powder, hexagonal ferrite powder and various ferromagnetic metal powders. In this case, the combination may also be made with a magnetic layer which comprises the same magnetic powder but is different in the elemental composition, the powder size or the like of the ferromagnetic powder.

In the present invention, the magnetic recording medium preferably has a structure such that a nonmagnetic layer is provided between the magnetic layer containing a ferromagnetic metal powder and the support. From the aspect of positional relationship of layers in such a layer structure, the magnetic layer and the nonmagnetic layer are sometimes referred to as an upper layer and a lower layer, respectively.

The lower layer is described in detail below. The lower layer is substantially nonmagnetic and is not particularly limited as long as it has a structure of containing a nonmagnetic powder and a binder. In the lower layer, a magnetic powder can also be used within the range capable of keeping the lower layer substantially nonmagnetic. The term "the lower layer is substantially nonmagnetic" as used herein means that the lower layer is allowed to have magnetism within the range of not substantially lowering the electromagnetic conversion characteristics of the upper layer.

The nonmagnetic powder can be selected, for example, from inorganic compounds such as metal oxide, metal carbonate, metal nitride and metal carbide. Examples of the inorganic compound include α-alumina having an α-conversion ratio of 90% or more, α-alumina, γ-alumina, θ-alumina, silicon carbide, chromium oxide, cerium oxide, α-iron oxide, goethite, silicon nitride, titanium dioxide, silicon dioxide, stannic oxide, magnesium oxide, zirconium oxide, zinc oxide and barium sulfate, and these may be used individually or in combination. Among these compounds, preferred are titanium dioxide, zinc oxide, αiron oxide and barium sulfate, more preferred are titanium dioxide and α-iron oxide. The α-iron oxide is preferably a magnetic iron oxide uniform in the particle size or an iron oxide obtained by subjecting a starting material for the metal to heating, dehydration and annealing to reduce the holes and if desired, further to a surface treatment. The titanium oxide usually has photocatalytic properties, therefore, upon exposure to light, radicals are generated and may disadvantageously react with the binder or lubricant. Therefore, in the present invention, the titanium dioxide must be used after solid-solving from 1 to 10% of Al, Fe or the like and thereby reducing the photocatalytic properties. The titanium dioxide is more preferably reduced in the catalytic activity by treating the surface thereof with a Al or Si compound. The particle size of the nonmagnetic powder is preferably from 0.005 to 1 μm, however, the same effect can be provided by combining, if desired, a nonmagnetic powder different in the particle size or even in the case of a single nonmagnetic powder, by broadening the particle size distribution.

The particle size of the nonmagnetic powder is more preferably from 0.01 to 0.5 μm. In particular, in the case where the nonmagnetic powder is a granulated metal oxide, the average equivalent circle diameter is preferably 0.08 μm, and in the case of a needle-like metal oxide, the average long diameter is 0.3 μm or less, more preferably 0.2 μm or less. The tap density is usually from 0.3 to 1.5 g/ml, preferably from 0.4 to 1.3 g/ml. The moisture content of the nonmagnetic powder is usually from 0.2 to 5% by mass, preferably from 0.3 to 3% by mass, more preferably from 0.3 to 1.5% by mass. The pH value of the nonmagnetic powder is usually from 2 to 12, preferably from 5.5 to 11. The specific surface area by the BET method ($S_{BET}$) of the nonmagnetic powder is usually from 1 to 100 m$^2$/g, preferably from 5 to 80 m$^2$/g, more preferably from 10 to 80 m$^2$/g. The crystallite size of the nonmagnetic powder is preferably from 40 to 1,000 Å, more preferably from 40 to 800 Å. The oil absorption amount using DBP (dibutyl phthalate) is usually from 5 to 100 ml/100 g, preferably from 10 to 80 ml/100 g, more preferably from 20 to 60 ml/100 g. The specific gravity is usually from 1.5 to 7, and preferably from 3 to 6. The shape may be any of needle-like form, spherical form, polyhedral form and plate form. The SA (stearic acid) absorption amount of the nonmagnetic powder is from 1 to 20 μmol/m$^2$, preferably from 2 to 15 μmol/m$^2$, more preferably from 3 to 8 μmol/m$^2$. In the case of using a nonmagnetic powder having a large stearic acid absorption amount, the surface thereof is preferably modified with an organic material capable of firmly adsorbing to the surface before use in the manufacture of a recording medium. The surface of the nonmagnetic powder is preferably treated with a compound containing an element such as Al, Mg, Si, Ti, Zr, Sn, Sb, Zn and Y. The oxide formed on the surface by this surface treatment is preferably Al$_2$O$_3$, SiO$_2$, TiO$_2$, ZrO$_2$, MgO or a hydrate oxide thereof. Among these, preferred are Al$_2$O$_3$, SiO$_2$, ZrO$_2$ and hydrate oxides thereof. These may be used in combination or alone. According to the purpose, a surface-treated layer having coprecipitated therein the compounds may be used or a method of forming alumina and then forming silica on the surface layer thereof or a method reversed thereto may also be used. The surface-treated layer may be a porous layer depending on the purpose but in general, the surface-treated layer is preferably uniform and dense.

Specific examples of the nonmagnetic powder for use in the lower layer include Nanotite (produced by Showa Denko K.K.), HIT-100, HIT-83 (produced by Sumitomo Chemical Co., Ltd.), α-iron oxide DPN-250BX, DPN-245, DPN-270BX, DPN-550BX, DPN-50RX, DBN-650RX, DAN-850RX (produced by Toda Kogyo K.K.), titanium oxide TTO-51B, TTO-55A, TTO-55B, TTO-55C, TTO-55S, TTO-55D, SN-100 (produced by Ishihara Sangyo Kaisha Ltd.), titanium oxide STT-4D, STT-30D, STT-30, STT-65C, α-iron oxide α-40 (produced by Titan Kogyo K.K.), titanium oxide MT-100S, MT-100T, MT-150W, MT-500B, MT-600B, MT-100F, MT-500HD (produced by Teika K.K.), FINEX-25, BF-1, BF-10, BF-20, ST-M (produced by Sakai Chemical Industry Co., Ltd.), iron oxide DEFIC-Y, DEFIC-R (produced by Dowa Mining Co., Ltd.), AS2BM, TiO2P25 (produced by Nippon Aerosil Co., Ltd.), 100A, 500A (produced by Ube Industries, Ltd.) and calcined products thereof.

In the lower layer, carbon black may be mixed to obtain known effects of reducing the surface electric resistance (Rs), reducing the light transmittance and having a desired micro Vickers' hardness. In the present invention, the carbon black used in the lower layer may also be incorporated as the above-described nonmagnetic powder. By incorporating carbon black into the lower layer, an effect of stocking a lubricant may also be brought out. Examples of the carbon black which can be used include furnace black for rubber, thermal black for rubber, carbon black for coloring, electrically conducting carbon black and acetylene black. The carbon black in the lower layer must optimize the following characteristics by the desired effect and a higher effect may be sometimes obtained by using these in combination.

The $S_{BET}$ of the carbon black in the lower layer is usually from 50 to 500 m$^2$/g, preferably from 70 to 400 m$^2$/g, the DBP oil absorption is usually from 20 to 400 ml/100 g, preferably from 30 to 400 ml/100 g. The average particle size of the carbon black is usually from 5 to 80 nm, preferably from 10 to 50 nm, more preferably from 10 to 40 nm. The pH of the carbon black is preferably from 2 to 10, the moisture content is preferably from 0.1 to 10% by mass, and the tap density is preferably from 0.1 to 1 g/ml. Specific examples of the carbon black for use in the present invention include BLACKPEARLES 2000, 1300, 1000, 900, 800, 880 and 700, VULCAN XC-72 (produced by Cabot Co., Ltd.), #3050B, #3150B, #3750B, #3950B, #950, #650B, #970B, #850B, MA-600, MA-230, #4000, #4010 (produced by Mitsubishi Kasei K.K.), CONDUCTEX SC, RAVEN 8800, 8000, 7000, 5750, 5250, 3500, 2100, 2000, 1800, 1500, 1255, 1250 (produced by Columbia Carbon Co., Ltd.) and Ketjen Black EC (produced by Akzo Co., Ltd.). The carbon black may be used after it is surface-treated with a dispersant or grafted with a resin or a part of the surface is graphitized. The carbon black may be previously dispersed in a binder before the addition to the coating solution. The carbon black can be used within the range of not exceeding 50% by mass based on the nonmagnetic powder and not exceeding 40% by mass based on the total mass of the lower layer. These carbon blacks can be used individually or in combination. With respect to the carbon blacks which can be used in the present invention, for example, *Carbon Black Binran* (*Handbook of Carbon Blacks*), compiled by Carbon Black Kyokai, may be referred to.

If desired, an organic powder may also be added to the lower layer. Examples of the organic powder include acryl styrene-base resin powder, benzoguanamine resin powder, melamine-base resin powder and phthalocyanine-base pigment. In addition, polyolefin-base resin powder, polyester-base resin powder, polyamide-base resin powder, polyimide-base resin powder and polyethylene fluoride resin may also be used. For the production thereof, methods described in JP-A-62-18564 and JP-A-60-255827 may be used.

With respect to the binder (kind and amount), the kinds and amounts of lubricant, dispersant and additives, the solvent and the dispersing method, known techniques for the upper layer may be applied.

For the binder in the magnetic layer or nonmagnetic layer of the magnetic recording medium of the present invention, a conventionally known thermoplastic resin, thermosetting resin or reactive resin or a mixture thereof may be used. As the thermoplastic resin, those having a glass transition temperature of −100 to 150° C., a number average molecular weight of 1,000 to 200,000, preferably from 10,OCO to 100,000, and a polymerization degree of approximately from 50 to 1,000 can be used.

Examples of this binder include polymers or copolymers containing, as a constituent unit, vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal or vinyl ether, polyurethane resins, and various rubber resins.

Examples of the thermosetting resin and the reactive resin include phenol resin, epoxy resin, curable polyurethane resin, urea resin, melamine resin, alkyd resin, acrylic reactive resin, formaldehyde resin, silicone resin, epoxy-polyamide resin, a mixture of polyester resin and isocyanate prepolymer, a mixture of polyesterpolyol and polyisocyanate, and a mixture of polyurethane and polyisocyanate.

In order to obtain more excellent effect of dispersing the ferromagnetic powder and higher durability of the magnetic layer, at least one polar group selected from the group consisting of —COOM, —SO$_3$M, —OSO$_3$M, —P=O(OM)$_2$, —O—P=O(OM)$_2$ (wherein M is hydrogen atom or an alkali metal salt group), —OH, —NR$_2$, —N$^+$R$_3$ (wherein R is a hydrocarbon group), an epoxy group, —SH and —CN is preferably introduced into the binder by copolymerization or addition reaction. The amount of the polar group is from $10^{-1}$ to $10^{-8}$ mol/g, preferably from $10^{-2}$ to $10^{-6}$ mol/g.

The binder for use in the magnetic recording medium of the present invention is used in the range from 5 to 50% by mass, preferably from 10 to 30% by mass, based on the nonmagnetic powder. In combination with this binder, vinyl chloride resin, polyurethane resin or polyisocyanate is preferably used in the range from 5 to 100% by mass, from 0 to 100% by mass, or from 2 to 100% by mass, respectively.

The filling degree of the ferromagnetic powder in the magnetic layer can be calculated from the saturation magnetization (σs) and Bm (maximum magnetic flux density of the ferromagnetic powder used (Bm/4πσs). In the present invention, the filling degree is preferably 1.7 g/ml or more, more preferably 1.9 g/ml or more, most preferably 2.1 g/ml or more.

In the present invention, in the case of using polyurethane, the polyurethane preferably has a glass transition temperature of −50 to 100° C., an elongation at break of 100 to 2,000%, a rupture stress of 0.05 to 10 kg/cm$^2$ (0.49 to 98 MPa) and a yielding point of from 0.05 to 10 kg/cm$^2$ (0.49 to 98 MPa).

Examples of the polyisocyanate which can be used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; reaction products of these isocyanates with polyalcohol; and polyisocyanates resulting from condensation of isocyanates. These isocyanates are commercially available under the trade names of Coronate L, Coronate HL, Coronate 2030, Coronate 2031, Millionate MR and Millionate MTL (produced by Nippon Polyurethane Co., Ltd.); Takenate D-102, Takenate D-110N, Takenate D-200 and Takenate D-202 (produced by Takeda Chemical Industries, Ltd.); and Desmodur L, Desmodur IL, Desmodur N and Desmodur HL (produced by Sumitomo Bayer Co., Ltd.). These products may be used individually or two or more thereof may be used in combination by making use of the difference in curing reactivity.

Usually, the magnetic layer and/or nonmagnetic layer of the magnetic recording medium of the present invention may contain materials having various functions according to the purpose, such as lubricant, abrasive, dispersant, antistatic agent, plasticizer and fungicide.

[0055]

Examples of the lubricant which can be used include silicon oil such as dialkylpolysiloxane (where the alkyl has from 1 to 5 carbon atoms), dialkoxypolysiloxane (where the alkoxy has from 1 to 4 carbon atoms), monoalkyl monoalkoxypolysiloxane (where the alkyl has from 1 to 5 carbon atoms and the alkoxy has from 1 to 4 carbon atoms), phenylpolysiloxane and fluoroalkylpolysiloxane (where the alkyl has from 1 to 5 carbon atoms); electrically conducting fine powder such as graphite; inorganic powder such as molybdenum disulfide and tungsten disulfide; plastic fine powder such as polyethylene, polypropylene, polyethylene-vinyl chloride copolymer and polytetrafluoroethylene; α-olefin polymers; saturated fatty acids (having from 10 to 22 carbon atoms) which are solid at ordinary temperatures; unsaturated aliphatic hydrocarbons (compounds where an n-olefin double bond is bonded to the terminal carbon; having about 20 carbon atoms) which are liquid at ordinary temperatures; fatty acid esters comprising a monobasic fatty acid having from 12 to 20 carbon atoms and a monohydric alcohol having from 3 to 12 carbon atoms; and fluorocarbons.

Among these lubricants, saturated fatty acids and fatty acid esters are preferred, and a combination use of a saturated fatty acid and a fatty acid ester is more preferred. Examples of the alcohol as a starting material of the fatty acid ester include monohydric alcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether and s-butyl alcohol; and polyhydric alcohols such as ethylene glycol, diethylene glycol, neopentyl glycol, glycerol and sorbitan derivatives. Examples of the fatty acid as a starting material include aliphatic carboxylic acids such as acetic acid, propionic acid, octanoic acid, 2-ethylhexanoic acid, lauric acid, myristic acid, stearic acid palmitic acid, behenic acid, arachic acid, oleic acid, linoleic acid, elaidic acid and palmitoleic acid, and a mixture thereof.

Specific examples of the fatty acid ester include various ester compounds such as butyl stearate, s-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, butoxyethyl stearate, 2-butoxy-1-propyl stearate, dipropyl glycol monobutyl ether esterified with stearic acid, diethylene glycol dipalmitate, hexamethylene diol formed into a diester by the esterification with myristic acid, and oleate of glycerol.

On use of a magnetic recording medium at high humidity, hydrolysis of the fatty acid ester often occurs and in order to reduce this, isomerism and branch position of the fatty acid and the alcohol as the starting materials, such as branch/straight or cis/trans, are selected. The lubricant is added in the range from 0.2 to 20 parts by mass per 100 parts by mass of the binder.

The following compounds may also be used as the lubricant. That is, silicon oil, graphite, molybdenum disulfide, boron nitride, graphite fluoride, fluoroalcohol, polyolefin, polyglycol, alkylphosphoric acid ester and tungsten disulfide may be used.

Examples of the abrasive for use in the magnetic layer of the present invention include commonly used materials such as α-alumina, γ-alumina, molten alumina, corundum, artificial corundum, silicon carbide, chromium oxide ($Cr_2O_3$), diamond, artificial diamond, garnet, emery (main component: corundum and magnetite) and α-$Fe_2O_3$. These abrasives have a Mohs' hardness of 6 or more. Specific examples of the abrasives include AKP-10, AKP-12, AKP-15, AKP-20, AKP-30, AKP-50, AKP-1520, AKP-1500, HIT-50, HIT-60A, HIT-70, HIT-80, HIT-82 and HIT-100 (produced by Sumitomo Chemical Co., Ltd.); G5, G7, S-1 and Chromium Oxide K (produced by Nippon Chemical Industrial Co., Ltd.); UB40B (produced by Uemura Kogyo K.K.); WA8000 and WA10000 (produced by Fujimi Kenmazai K.K.); and TF100, TF140 and TF180 (produced by Toda Kogyo K.K.). Abrasives having an average particle size of 0.05 to 3 µm, preferably from 0.05 to 1.0 µm are effective.

The abrasive is added in a total amount of 1 to 20 parts by mass, preferably from 1 to 15 parts by mass, per 100 parts by mass of the magnetic powder. If the total amount is less than 1 part by mass, sufficiently high durability may not be obtained, whereas if it exceeds 20 parts by mass, the surface properties and filling degree are liable to deteriorate. The abrasive may be previously dispersed in a binder before the addition to the magnetic coating material.

The magnetic layer of the magnetic recording medium of the present invention may contain electrically conducting particles as an antistatic agent in addition the nonmagnetic powder. In the case of a magnetic recording medium where a nonmagnetic layer is provided between the support and the magnetic layer, in order to maximize the saturation magnetization of the upper layer, the antistatic agent is preferably added to a layer other than the upper layer, while reducing the amount added to the upper layer. The antistatic agent is preferably carbon black because the surface electrical resistance of the entire medium can be reduced. Examples of the carbon black which can be used in the present invention include furnace black for rubber, thermal black for rubber, carbon black for coloring, electrically conducting carbon black and acetylene black. The carbon black preferably has an $S_{BET}$ of 50 to 500 m$^2$/g, a DBP oil absorption of 10 to 1,500 ml/100 g, an average particle size of 5 to 300 nm, a pH of 2 to 10, a moisture content of 0.1 to 10% by mass and a tap density of 0.1 to 1 g/ml. specific examples of the carbon black for use in the present invention include BLACK-PEARLES 2000, 1300, 1000, 900, 800, 880 and 700, and VULCAN XC-72 (produced by Cabot Co., Ltd.); #80, #60, #55, #50 and #35 (produced by Asahi Carbon Cc)., Ltd.); #3950B, #2700, #2650, #2600, #2400B, #2300, #900, #1000, #95, #30, #40, #10B, MA230, MA220 and MA77 (produced by Mitsubishi Chemical Corporation); RAVEN 150, 50, 40 and 15 (produced by Columbia Carbon Co., Ltd.); and Ketjen Black EC, Ketjen Black ECDJ-500 and Ketjen Black ECDJ-600 (produced by Lion Akzo Co., Ltd.). The carbon black may be used after surface-treatment with a dispersant, oxidation treatment or grafting with a resin or after graphitizing a part of the surface. The carbon black may also be previously dispersed in a binder before the addition to the magnetic coating material. In the case of using carbon black in the magnetic layer, the carbon black is preferably used in an amount of 0.1 to 30% by mass based on the magnetic powder. The non-magnetic layer preferably contains carbon black in an amount of 3 to 20% by mass based on the inorganic nonmagnetic powder (provided that carbon black is not included in the nonmagnetic powder).

In general, carbon black not only has a function as an antistatic agent but also serves to reduce the coefficient of friction, impart light-shielding property and improve the film strength. These functions may vary depending on the carbon black used. Accordingly, needless to say, the kind, amount and combination of these carbon blacks can be changed to fit for the purpose in the light of the above-described various properties such as powder size, oil absorption, electrical conductivity and pH. The carbon black which can be used in the present invention can be referred to in *Carbon Black Binran* (*Handbook of Carbon Black*), compiled by Carbon Black Kyokai.

In the case of manufacturing the magnetic recording medium of the present invention by forming two or more coating layers on a support, the method for forming the layers included a successive coating system (wet-on-dry system) and a simultaneous coating system (wet-on-wet system). The latter is particularly excellent because an ultrathin magnetic layer can be formed. Specific examples of the simultaneous coating system, namely, the wet-on-wet system include the following methods:

(1) a method where a magnetic coating material for lower layer is first coated by a general coating apparatus employing gravure coating, roll coating, blade coating or extrusion coating method, and while the lower layer is still in the wet state, an upper layer is coated thereon by means of a support pressure-type extrusion coating apparatus disclosed, for example, in JP-B-1-46186, JP-B-60-238179 and JP-B-2-265672;

(2) a method of almost simultaneously coating a coating solution for the lower layer and a coating solution for the upper layer by means of a coating head self-containing two coating solution-passing slits disclosed in JP-A-63-88080, JP-A-2-17921 and JP-A-2-265672; and (3) a method of almost simultaneously coating an upper layer and a lower layer by means of an extrusion coating apparatus with a backup roll disclosed in JP-A-2-174965.

In the case of coating the layers by a wet-on-wet system, the coating solution for the magnetic layer and the coating solution for the nonmagnetic layer are preferably approximated in the fluidity properties, so that the interface between the magnetic layer and the nonmagnetic layer coated can be prevented from occurrence of disturbance and a magnetic layer uniform in the thickness and reduced in the fluctuation of thickness can be obtained. The fluidity properties of the coating solution greatly depends on the combination of powder and binder in the coating solution, therefore, it is important to prudently select the nonmagnetic powder for use in the nonmagnetic layer.

The support of the magnetic recording medium of the present invention usually has a thickness of 1 to 100 $\mu$m, preferably, in the case of using it as a tape, from 3 to 20 $\mu$m and in the case of using as a flexible disc, from 40 to 80 $\mu$m. The nonmagnetic layer provided on the support usually has a thickness of 0.5 to 10 $\mu$m, preferably from 0.5 to 3 $\mu$m.

In addition to the above-described magnetic layer and nonmagnetic layer, other layers may be formed according to the purpose. For example, an undercoat layer may be provided between the support and the lower layer so as to improve the adhesion. The thickness of this layer is usually from 0.01 to 2 $\mu$m, preferably from 0.05 to 0.5 $\mu$m. On the surface of the support opposite the magnetic layer, a back layer may be provided. The thickness of the back layer is usually from 0.1 to 2 $\mu$m, preferably from 0.3 to 1.0 $\mu$m. For these undercoating and back layers, known materials may be used. In the case of a disc magnetic recording media, the above-described layer structure may be provided on one surface or both surfaces.

The support which can be used in the present invention is not particularly limited and those commonly used may be used. Examples of the material for constituting the support include films of various synthetic resins such as polyethylene terephthalate, polyethylene, polypropylene, polycarbonate, polyethylene naphthalate, polyamide, polyamideimide, polyimide, polysulfone and polyethersulfone, and metal foils such as aluminum foil and stainless steel foil.

In order to effectively attain the object of the present invention, the support suitably has a surface roughness of 0.03 $\mu$m or less, more preferably 0.02 $\mu$m or less, still more preferably 0.01 $\mu$m, in terms of the center plane average surface roughness (SRa) (cutoff value: 0.25 mm). The support preferably has not only a small center plane average surface roughness but also are free of coarse protrusions of 1 $\mu$m or more. The roughness form of the surface can be freely controlled by the size and amount of filler which is optionally added. Examples of the filler include oxides and carbonates of Ca, Si and Ti, and finely powdered organic resins such as acrylic resin. The support for use in the present invention preferably has an F-5 value of 5 to 50 kg/mm$^2$ (49 to 490 MPa) in the web running direction and an F-5 value of 3 to 30 kg/mm$^2$ (29 to 290 MPa) in the web width direction. In general, the F-5 value in the web longitudinal direction is higher than the F-5 value in the web cross direction, however, this does not apply when the cross strength must be increased. The heat shrinkage of the support is preferably 3% or less, more preferably 1.5% or less, at 100° C. for 30 minutes, and 1% or less, more preferably 0.5% or less, at 80° C. for 30 minutes, in the web running and cross directions. The strength at breakage of the support is preferably from 5 to 100 kg/mm$^2$ (49 to 980 MPa) and the elastic modulus is preferably from 100 to 2,000 kg/mm$^2$, in both directions.

The organic solvent for use in the present invention can be used at an arbitrary ratio and examples thereof include ketones such as acetone, methyl ethyl ketone, methyl isobutyl ketone, diisobutyl ketone, cyclohexanone, isophorone and tetrahydrofuran; alcohols such as methanol, ethanol, propanol, butanol, isobutyl alcohol, isopropyl alcohol and methyl cyclohexanol; esters such as methyl acetate, butyl acetate, isobutyl acetate, isopropyl acetate, ethyl lactate and glycol acetate; glycol ether-base solvents such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide; and hexane. The organic solvent may not be necessarily 100% pure and may contain impurities such as isomer, unreacted matter, side reaction product, decomposition product, oxide and water content, in addition to the main component. These impurities are preferably contained in a proportion of 30% or less, more preferably 10% or less. If desired, the kind and amount of the organic solvent for use in the present invention may be changed between the magnetic layer and the nonmagnetic layer. For example, a highly volatile solvent may be used for the nonmagnetic layer to improve the surface properties, a solvent having a high surface tension (e.g., cyclohexanone, dioxane) may be used for the nonmagnetic layer to improve the coating stability, or a solvent having a high solubility parameter may be used for the magnetic layer to enhance the filling density, however, the present invention is of course not limited to these examples.

The magnetic recording medium of the present invention is obtained by kneading and dispersing a nonmagnetic powder or ferromagnetic powder and a binder, if desired, together with other additives using an organic solvent, and applying the thus-obtained nonmagnetic coating material and non-magnetic coating material on a support, followed by, if desired, orientation and drying.

The process of producing the magnetic coating material of the magnetic recording medium of the present invention comprises at least a kneading step, a dispersing step, and a mixing step optionally provided before or after these steps. Each step may be divided into two or more stages. The raw materials for use in the present invention, such as nonmagnetic powder, ferromagnetic powder, binder, carbon black, abrasive, antistatic agent, lubricant and solvent, may be added at the beginning or on the way of any step. Individual raw materials may be added in parts in two or more steps. For example, polyurethane may be charged in parts in the kneading step, in the dispersing step or after the dispersion, so as to adjust the viscosity.

For the kneading and dispersion of the nonmagnetic coating material or the magnetic coating material, various kneaders may be used and examples thereof include two-roll mill, three-roll mill, ball mill, pebble mill, Trommel mill, sand grinder, Szegvari, attritor, high speed impeller dispersing machine, high speed stone mill, high speed impact mill, disper, kneader, high speed mixer, homogenizer and ultrasonic dispersing machine.

In order to accomplish the object of the present invention, a conventionally known production technique can of course be used as a part of the process, however, in the kneading step, means having a strong kneading power, such as continuous kneader and pressure kneader, is preferably used. In the case of using a continuous kneader or a pressure kneader, the coating material is kneaded in the range from 15 to 500 parts by mass per 100 parts by mass of the magnetic powder, all or a part of the binder (but preferably in an amount of 30% by mass or more of the entire binder) and ferromagnetic metal powder. These kneading treatments are described in detail in JP-A-1-106388 and JP-A-64-79274. In the present invention, a simultaneous multilayer coating method described in JP-A-62-212933 can be used to attain higher efficiency in the production.

The amount of the residual solvent contained in the magnetic layer of the magnetic recording medium of the present invention is preferably 100 mg/m$^2$ or less, more preferably 10 mg/m$^2$ or less. The amount of the residual solvent contained in the magnetic layer is preferably smaller than that in the nonmagnetic layer.

In both the lower layer and the upper layer, the percentage of voids is preferably 30% by volume or less, more preferably 10% by volume or less. The percentage of voids in the nonmagnetic layer is preferably larger than that in the magnetic layer but may be smaller as long as the percentage of voids in the nonmagnetic layer is 5% by volume or more.

The magnetic recording medium of the present invention may comprise a lower layer and an upper layer and as easily presumed, the physical properties can be different between the lower layer and the upper layer. For example, the elasticity of the upper layer can be increased to improve the running durability and at the same time, the elasticity of the lower layer can be lowered to improve the contact of the magnetic recording medium with the head.

The magnetic layer coated on a support is subjected to a treatment of orienting the ferromagnetic powder in the layer, if desired, and then the magnetic layer formed is dried. Furthermore, the coating is subjected to a surface smoothing treatment or cut into a desired shape, if desired, to produce the magnetic recording medium of the present invention. The above-described composition for the upper layer or additionally the composition for the lower layer is dispersed together with a solvent, the coating solution obtained is coated on a support, and the coating is oriented and dried to obtain a magnetic recording medium.

The elastic modulus of the magnetic layer is preferably from 100 to 2,000 Kg/mm$^2$ (980 to 19,600 MPa) at an elongation of 0.5% in both the web coating direction and the web cross direction and the strength at breakage is preferably from 1 to 30 Kg/cm$^2$ (9.8 to 290 MPa). The elastic modulus of the magnetic recording medium is preferably from 100 to 1,500 Kg/mm$^2$ in both the web coating direction and the web cross direction, the residual elongation is preferably 0.5% or less, and the heat shrinkage is preferably 1% or less, more preferably 0.5% or less, still more preferably 0.1% or less, at all temperatures below 100° C.

The magnetic recording medium of the present invention may be a tape for use in video or audio or may be a flexible disc or a magnetic disc for use in data recording. The magnetic recording medium of the present invention is useful particularly as a medium for digital recording where lack of signals due to generation of dropouts is fatal. Furthermore, by providing the nonmagnetic layer as the lower layer and forming the magnetic layer to a thickness of 0.5 μm or less on the lower layer, a high-density and large-capacity magnetic recording medium having high electromagnetic characteristics and excellent overwrite properties can be obtained.

The novel characteristic features of the present invention is described in greater detail below by referring to the Example, however, the present invention should not be construed as being limited thereto.

(Preparation of Ferromagnetic Metal Powder)

EXAMPLES A-1 TO A-7 AND COMPARATIVE EXAMPLES A-8 AND A-9:

The following ferromagnetic metal powder mainly comprising Fe was prepared by reducing and oxidizing an iron oxide containing Co, Al and Y.

Example A-1

A needle-like α-FeOOH powder having an average long axis length of 0.15 μm and an average acicular ratio of 8 and containing 30 atm % of Co based on Fe was prepared.

This needle-like particle of α-FeOOH was obtained by adding an aqueous NaOH solution in 1.6 equivalents to an aqueous ferric salt solution to cause precipitation of ferric hydroxide and ripening the suspension containing the precipitate for 16 hours while keeping the temperature at 45° C. At this time, Co was incorporated by adding first cobaltate during the ripening.

Separately, a solution obtained by dissolving 9.8 g of aluminum sulfate [$Al_2(SO_4)_3$] in 5 liter of pure water and adjusted to a pH of 12.5 was prepared.

In this aqueous solution, 50 g of the Co-containing spindle-type α-FeOOH powder prepared above was suspended and thoroughly stirred. Into the resulting slurry, carbonic acid gas was blown to neutralize the slurry to a pH of 9 or less and thereby allow hydrous aluminum oxide ($Al_2O_3 \cdot nH_2O$) to attach to the surface of α-FeOOH particle. The thus-obtained particles covered with hydrous aluminum oxide were filtered, washed with water and heated at 400° C. for 3 hours to obtain Co-containing iron oxide covered with $Al_2O_3$. This powder contained 10 atm % of Al based on Fe.

The iron oxide powder obtained was suspended in 1 liter of an aqueous solution having dissolved therein 4.7 g of yttrium nitrate [$Y_2(NO_3)_3$], and the resulting slurry was placed in a drier to evaporate the water content at 100° C., suspended in 5 liter of pure water, filtered, heated, washed with pure water at 60° C. and then dried.

The thus-obtained iron oxide particles each containing Al, Y and Co were heated in a rotary furnace at 370° C. for 10 hours while introducing an $H_2$ steam thereinto, thereby performing the initial reduction. After the completion of initial reduction, an $N_2$ gas was introduced to cool the furnace to 60° C. and thereafter, the particles were gradually oxidized for 2 hours by introducing an $N_2$ gas containing 1,000 ppm of $O_2$, thereby obtaining a ferromagnetic metal powder containing Al, Y and Co. Subsequently, this powder was heated in a rotary furnace at 450° C. for 10 hours while introducing an $H_2$ gas and thereby reduced. After the completion of this second reduction in later stage, an $N_2$ gas was introduced to cool the furnace to 60° C. and thereafter, an $N_2$ gas containing 300 ppm of $O_2$ was introduced to gradually oxidize the powder for 5 hours, thereby obtaining a ferromagnetic metal powder containing Al, Y and Co.

The analysis values, powder properties and magnetic properties of the thus-obtained ferromagnetic powder are shown in Table 1.

Example A-2

A ferromagnetic metal powder containing Al, Y and Co was obtained in the same manner as in Example A-1 except that the amount of aluminum sulfate [$Al_2(SO_4)_3$] was changed from 9.8 g to 10.8 g, the Al content was 11 atm % based on Fe, the reduction in later stage of heating and thereby reducing the powder for 10 hours was performed by changing the temperature from 450° C. to 500° C. at the time of introducing the $H_2$ stream into the rotary furnace, and after the completion of reduction in later stage and cooling the furnace to 60° C. by introducing an $N_2$ gas, the gradual oxidization treatment was performed for 5 hours by changing the $O_2$ concentration, namely, from the gas containing 300 ppm of $O_2$ to an $N_2$ gas containing 500 ppm of $O_2$. The analysis values, powder properties and magnetic properties of the thus-obtained ferromagnetic powder are shown in Table 1.

Example A-3

A ferromagnetic metal powder containing Al, Y and Co was obtained in the same manner as in Example A-1 except that a needle-like α-FeOOH powder having an average long axis length of 0.15 μm and an average acicular ratio of 8 and containing 20 atm % of Co based on Fe was prepared and the amount of yttrium nitrate [$Y_2(NO_3)_3$] was changed from 4.7 g to 2.0 g. The analysis values, powder properties and magnetic properties of the thus-obtained ferromagnetic powder are shown in Table 1.

Example A-4

A ferromagnetic metal powder containing Al, Y and Co was obtained in the same manner as in Example A-1 except that a needle-like α-FeOOH powder having an average long axis length of 0.15 μm and an average acicular ratio of 10 and containing 30 atm % of Co based on Fe was prepared, the amount of yttrium nitrate [$Y_2(NO_3)_3$] was changed from 4.7 g to 4.0 g, and after the completion of reduction in later stage and cooling the furnace to 60° C. by introducing an $N_2$ gas, the gradual oxidization treatment was performed for 5 hours by changing the $O_2$ concentration, namely, from the gas containing 300 ppm Of $O_2$ to an $N_2$ gas containing 800 ppm of $O_2$. The analysis values, powder properties and magnetic properties of the thus-obtained ferromagnetic powder are shown in Table 1.

Example A-5

A ferromagnetic metal powder containing Al, Y and Co was obtained in the same manner as in Example A-4 except that the amount of aluminum nitrate [$Al_2(SO_4)_3$] was changed from 9.8 g to 10.8 g, the Al content was 11 atm % based on Fe, and the reduction in later stage of heating and thereby reducing the powder for 10 hours was performed by changing the temperature from 450° C. to 530° C. at the time of introducing the $H_2$ gas into the furnace. The analysis values, powder properties and magnetic properties of the thus-obtained ferromagnetic powder are shown in Table 1.

Example A-6

A ferromagnetic metal powder containing Al, Y and Co was obtained in the same manner as in Example A-1 except that a needle-like α-FeOOH powder having an average long axis length of 0.11 μm and an average acicular ratio of 8 and containing 25 atm % of Co based on Fe was prepared and the amount of yttrium nitrate [$Y_2(NO_3)_3$] was changed from 4.7 g to 7.0 g. The analysis values, powder properties and magnetic properties of the thus-obtained ferromagnetic powder are shown in Table 1.

Example A-7

A ferromagnetic metal powder containing Al, Y and Co was obtained in the same manner as in Example A-6 except that a needle-like α-FeOOH powder having an average long axis length of 0.085 μm and an average acicular ratio of 8 and containing 25 atm % of Co based on Fe was prepared. The analysis values, powder properties and magnetic properties of the thus-obtained ferromagnetic powder are shown in Table 1.

Comparative Example A-8

A ferromagnetic metal powder containing Al and Co was obtained in the same manner as in Example A-1 except that the amount of aluminum sulfate [$Al_2(SO_4)_3$] was changed from 9.8 g to 4.9 g, the Al content was 5 atm % based on Fe, the yttrium nitrate [$Y_2(NO_3)_3$] was not used, and the thus-obtained iron oxide particles each containing Al and Co were subjected only once to the reduction and gradual oxidization, more specifically, the iron oxide particles were heated in a rotary furnace at 450° C. for 5 hours while introducing an $H_2$ stream and thereby reduced and after the completion of reduction, an $N_2$ gas was introduced to cool the furnace to room temperature and thereafter, the particles were gradually oxidized for 5 hours by introducing an $N_2$ gas containing 300 ppm of $O_2$. The analysis values, powder properties and magnetic properties of the thus-obtained ferromagnetic powder are shown in Table 1.

Comparative Example A-9

A ferromagnetic metal powder containing Co was obtained in the same manner as in Example A-8 except that aluminum sulfate [$Al_2(SO_4)_3$] was not used and a needle-like α-FeOOH powder having an average long axis length of 0.15 μm and an average acicular ratio of 8 and containing 30 atm % of Co based on Fe was directly heated in a rotary furnace at 370° C. for 10 hours while introducing an $H_2$ stream and thereby reduced. The analysis values, powder properties and magnetic properties of the thus-obtained ferromagnetic powder are shown in Table 1.

Various sizes of the thus-obtained ferromagnetic metal powders were measured by the methods described above. The magnetic properties were measured by a vibrating sample magnetometer (manufactured by Toei Industry Co., Ltd.) with an external magnetic field of 10 KOe ($7.95774 \times 10^5$ A/m).

The oxide film was measured by an X-ray diffraction method and evaluated by the structure and the diffraction peak width obtained. The measurement was performed under the conditions of using CuKα as the counter cathode.

The Δσs was determined from σs (t1) after storage at 60° C. and 90% RH for 1 week and σs (t0) before storage, according to the following formula:

$$\Delta\sigma s = 100 \times \{\sigma s(t0) - \sigma s(t1)\} / \sigma s(t0)$$

TABLE 1

| | Ferromagnetic Metal Powder | | | | | | | | | | | | | | |
|---|---|---|---|---|---|---|---|---|---|---|---|---|---|---|---|
| | Composition, atm % (based on Fe) | | | Size | | | Oxide Layer | | | | | | | | |
| | | | | | | | Thickness of Oxide Film (nm) | X-Ray Diffraction, Kind | X-Ray Diffraction, FeOx peak | | $S_{BET}$ ($m^2$/g) | | Hc (Oe) | Hc ($10^5$ A/m) | Δσs (%) | SQ |
| | Co | Al | Y | Average Long Diameter (nm) | Average Short Diameter (nm) | Average Acicular Ratio | | | | σs* | | σs* | | | | |
| Example A-1 | 30 | 10 | 7 | 93 | 16.5 | 5.6 | 1.8 | FeOx | sharp peak | 58 | 45 | 153 | 2364 | 1.88 | 9.7 | 0.52 |
| Example A-2 | 30 | 11 | 7 | 93 | 16.5 | 5.6 | 2.0 | FeOx | sharp peak | 55 | 47 | 154 | 2384 | 1.90 | 8.5 | 0.53 |
| Example A-3 | 20 | 10 | 2 | 94 | 16.2 | 5.8 | 2.5 | FeOx | sharp peak | 78 | 55 | 143 | 1610 | 1.28 | 4.5 | 0.52 |
| Example A-4 | 30 | 10 | 6 | 91 | 14.4 | 6.3 | 2.8 | FeOx | sharp peak | 90 | 48 | 147 | 2424 | 1.93 | 3.3 | 0.53 |
| Example A-5 | 30 | 11 | 6 | 87 | 16.7 | 5.2 | 2.9 | FeOx | sharp peak | 88 | 58 | 139 | 2260 | 1.80 | 5.6 | 0.52 |
| Example A-6 | 25 | 10 | 10 | 70 | 14.0 | 5.0 | 2.0 | FeOx | sharp peak | 80 | 71 | 125 | 2365 | 1.88 | 9.0 | 0.52 |
| Example A-7 | 25 | 10 | 10 | 50 | 10.0 | 5.0 | 2.0 | FeOx | sharp peak | 80 | 77 | 115 | 2210 | 1.76 | 9.5 | 0.51 |
| Comparative Example A-8 | 30 | 5 | 0 | 93 | 16.5 | 5.6 | 2.0 | FeOx and FeOOH | slightly broad peak | 28 | 48 | 144 | 1860 | 1.48 | 18.5 | 0.43 |
| Comparative Example A-9 | 30 | 0 | 0 | 93 | 16.5 | 5.6 | 2.0 | FeOx and FeOOH | broad peak | 14 | 50 | 145 | 1300 | 1.03 | 25.0 | 0.36 |

*A · $m^2$/kg

On comparison between the present invention and Comparative Examples in Table 1, it is seen that even if the ferromagnetic metal powders are the same in the long diameter and the short diameter, the ferromagnetic metal powder of the present invention in which an iron oxide layer having a predetermined magnetism is provided is smaller in the desensitization and higher in Hc and σs.

(Use Example as Tape)

Example B-1

In order to manufacture a magnetic tape having a multilayer structure using the ferromagnetic metal powder having the properties shown in Example A-1 of Table 1, a composition for magnetic layer and a composition for nonmagnetic layer were prepared as follows. In the following formulations, the "parts" all indicate "parts by mass".

(Composition for Magnetic Layer)

| | |
|---|---|
| Ferromagnetic powder (prepared in Example A-1) | 100 parts |
| Binder Resin | |
| Vinyl chloride polymer (containing 1 × $10^{-4}$ eq/g of -$SO_3$Na group, polymerization degree: 300) | 13 parts |
| Polyester polyurethane resin (neopentyl glycol/caprolactone polyol/MDI (= 0.9/2.6/1 by mol), containing 1 × $10^{-4}$ eq/g of -$SO_3$Na group) | 5 parts |
| Alumina fine particulate powder (average particle size: 180 nm) | 5.0 parts |
| Carbon black (average particle size: 40 nm) | 1.0 part |
| Butyl stearate | 2 parts |
| Stearic acid | 2 parts |
| A 1:1 mixed solvent of methyl ethyl ketone and cyclohexanone | 200 parts |

(Composition for Nonmagnetic Layer)

| | |
|---|---|
| Acicular hematite (specific surface area by BET: 55 $m^2$/g, average long diameter: 0.12 μm, acicular ratio: 8, pH: 8.8, treated with aluminum, Al/Fe: 6.5 atm %) | 80 parts |
| Carbon Black (average primary particle size: 17 nm, DBP oil absorption: 80 ml/100 g, surface area by BET: 240 $m^2$/g, pH: 7.5) | 10 parts |
| Binder resin | |
| Vinyl chloride polymer (containing 1 × $10^{-4}$ eq/g of -$SO_3$Na group, polymerization degree: 300) | 12 parts |
| Polyester polyurethane resin (neopentyl glycol/caprolactone polyol/MDI (= 0.9/2.6/1 by mol), containing 1 × $10^{-4}$ eq/g of -$SO_3$Na) | 5 parts |
| Butyl stearate | 1 part |
| Stearic acid | 2.5 parts |
| A 1:1 mixed solvent of methyl ethyl ketone and cyclohexanone | 200 parts |

The composition for magnetic layer and the composition for nonmagnetic layer each was kneaded in a kneader and dispersed using a sand grinder. To the dispersion solutions obtained, polyisocyanate was added, in the case of the coating solution for nonmagnetic layer, in an amount of 5 parts and in the case of the coating solution for magnetic layer, in an amount of 6 parts. Furthermore, a 1:1 mixed solvent of methyl ethyl ketone and cyclohexanone was added in an amount of 20 parts and the resulting solutions each was filtered through a filter having an average pore size of 1 μm to prepare coating solutions for nonmagnetic layer and for magnetic layer.

The coating solutions were coated on a 7 μm-thick polyethylene terephthalate support by a wet simultaneous multilayer coating method such that the coating solution for nonmagnetic layer was coated to have a dry thickness of 1.5 μm and immediately thereafter while the coated nonmagnetic layer was still in wet state, the coating solution for magnetic layer was coated thereon to have a thickness of 0.15 μm. While these two layers were still in wet state, the multilayer coating was passed through an orientation apparatus and longitudinally oriented. At this time, the orientation was performed by passing the coating through a rare earth magnet (surface magnetic flux: 0.5 T) and then through a solenoid magnet (magnetic flux density: 0.5 T). The coating was dried in the solenoid to an extent such that the orientation thus gained was fixed, and then the magnetic layer was dried. Thereafter, the coating was taken up and calendered by means of a 7-stage calender comprising metal rolls while setting the roll temperature at 90° C. to obtain a web magnetic recording medium. This web magnetic recording medium was then slit into a width of 8 mm, thereby preparing a 8-mm video tape sample.

Examples B-2 to B-5

Multilayer tapes were prepared in the same manner as in Example B-1 except for changing the kinds of ferromagnetic metal powder as shown in Table 2 using ferromagnetic powders having properties shown in Examples A-2, A-4, A-6 and A-7 of Table 1 as the ferromagnetic powder.

Comparative Examples B-1 and B-2

Multilayer tapes were prepared in the same manner as in Example B-1 except for using ferromagnetic metal powders having properties shown in Comparative Examples A-8 and A-9 of Table 1 as the ferromagnetic powder.

The thus-obtained samples were measured on the magnetic properties and the surface roughness by a vibrating sample magnetometer and on the ½Tb out put and C/N using a drum tester. The values obtained are shown in Table 1. In the evaluation of the electromagnetic characteristics, the tape of Comparative Example B-1 was used as the standard.

The magnetic properties were measured in parallel to the orientation direction by a vibrating sample magnetometer (manufactured by Toei Industry Co., Ltd.) with an external magnetic field of 5 KOe ($3.97887 \times 10^5$ A/m). SQ indicates squareness ratio. SFDr (switching-field distribution) indicates half-value width/Hc distribution on the B-H differential curve.

The ΔBm was determined from Bm (t1) after storage at 60° C. and 90% RH for 1 week and Bm (t0) before storage, according to the following formula:

$$\Delta Bm = 100 \times \{Bm(t0) - Bm(t1)\}/Bm(t0)$$

The surface roughness was determined from the area of a 250 μm-square sample using an optical profiler: "TOPO-3D" manufactured by WYKO (Arizona, U.S.A.). In the calculation of the measured value, corrections such as inclination correction, spherical correction and cylindrical correction were performed according to JIS-B601 and the center plane average surface roughness Ra was used as the surface roughness value.

TABLE 2

| | | Ferromagnetic Metal Powder | Magnetic Properties | | | | | | Surface | | |
| | | | Hc (Oe) | Hc ($10^5$ A/m) | SQ | Bm ($10^{-4}$ T) | SFDr | ΔBm % | Roughness (nm) | Output (dB) | C/N (dB) |
|---|---|---|---|---|---|---|---|---|---|---|---|
| Example | B-1 | A-1 | 2480 | 1.96 | 0.87 | 5240 | 0.227 | 1.3 | 2.5 | 3.9 | 3.3 |
| Example | B-2 | A-2 | 2490 | 1.98 | 0.87 | 4860 | 0.217 | 1 | 2.5 | 4.1 | 3.5 |
| Example | B-3 | A-4 | 2510 | 2.00 | 0.88 | 5100 | 0.248 | 0.4 | 2.4 | 4.3 | 3.6 |
| Example | B-4 | A-6 | 2430 | 1.93 | 0.88 | 4350 | 0.247 | 1.9 | 2.3 | 3.7 | 3.8 |
| Example | B-5 | A-7 | 2300 | 1.83 | 0.86 | 4070 | 0.252 | 2.1 | 2.2 | 3.6 | 39.0 |
| Comparative Example | B-1 | A-8 | 1930 | 1.54 | 0.76 | 4560 | 0.423 | 3.2 | 2.7 | 0 | 0.0 |
| Comparative Example | B-2 | A-9 | 1350 | 1.07 | 0.71 | 4230 | 0.456 | 4.1 | 2.9 | −3.8 | −3.4 |

It is seen from Table 2 that in Examples of the present invention, SQ, SFDr, output and C/N are good. The present inventors presume that although fine particulate ferromagnetic metal powders of 100 nm or less have been heretofore very difficult to increase in the σs and improve in the demagnetization property, as a result of providing a highly crystalline iron oxide layer having magnetism, the ferromagnetic metal particle can be increased in the portion substantially participating in the magnetism and at the same time, favored with reduction in the desensitization during storage at high temperature and high humidity, storage and chemical stability, high Hc, high SQ, excellent SFD and reduced Hc distribution and in turn, a ferromagnetic metal powder having fine particle size, high coercivity, narrow Hc distribution, excellent overwrite properties, high output, high C/N and excellent noise property can be obtained as in the present invention.

The magnetic recording medium using this powder can have low noise and high C/N.

The magnetic recording medium also exhibits excellent contact with MR head.

(Preparation of Magnetic Disc)

Examples C-1 to C-5 and Comparative Examples C-1 and C-2

Using ferromagnetic metal powders shown in Table 1, magnetic discs were prepared as follows.

| <Manufacture of Coating Material> | |
| --- | --- |
| Magnetic Coating Material X | |
| Ferromagnetic Metal Powder A-1 to A-9 (see Table 1) | 100 parts |
| Vinyl chloride copolymer MR 110 (produced by Nippon Zeon) | 12 parts |
| Polyester polyurethane resin UR8200 (produced by Toyobo) | 3 parts |
| Alumina HIT55 (produced by Sumitomo Chemical Co., Ltd.) | 10 parts |
| #50 (produced by Asahi Carbon) | 5 parts |
| Butyl stearate | 7 parts |
| Butoxyethyl stearate | 3 parts |
| Isohexadecyl stearate | 2 parts |
| Stearic acid | 2 parts |
| Methyl ethyl ketone | 180 parts |
| Cyclohexanone | 180 parts |
| Nonmagnetic Coating Material | |
| Nonmagnetic powder $Fe_2O_3$ | 80 parts |
| Conductex SC-U (produced by Colombian Carbon) | 20 parts |
| MR110 | 12 parts |
| UR8200 | 5 parts |
| Butyl stearate | 10 parts |
| Butoxyethyl stearate | 5 parts |
| Isohexadecyl stearate | 2 parts |
| Stearic acid | 3 parts |
| Methyl ethyl ketone/cyclohexanone (8/2 mixed solvent) | 250 parts |

In each of these two coating materials, the components were kneaded by a kneader and dispersed using a sand mill. To each dispersion solution obtained, polyisocyanate was added in an amount of 10 parts to the coating solution for nonmagnetic layer and also in an amount of 10 parts to the coating solution for magnetic layer, and furthermore, 40 parts of butyl acetate was added to each coating solution. The resulting coating solutions each was filtered through a filter having an average pore size of 1 μm to prepare a coating solution for forming a nonmagnetic layer and a coating solution for forming a magnetic layer.

The thus-obtained coating solutions were coated on a 62 μm-thick polyethylene terephthalate support having a center plane surface roughness of 0.01 μm by a simultaneous multilayer coating method where the coating solution for nonmagnetic layer was coated to have a dye thickness of 1.5 μm, immediately thereafter, the coating solution for magnetic layer was coated thereon to a thickness of 0.2 μm, and while these two layers were still in wet state, the obtained coating film was subjected to a random orientation treatment by passing it through an a.c. magnetic field-generating apparatus having two magnetic filed intensities of 0.025T at a frequency of 50 Hz and 0.012T at a frequency of 50 Hz. Thereafter, the coating film was dried, treated in a 7-stage calender at a temperature of 90° C. and a line pressure of 300 Kg/cm (2940 N/cm), blanked into 3.7 inch, subjected to a surface polishing treatment, loaded into a 3.7-inch cartridge (zip-disk cartridge produced by Iomega, U.S.A.) with a liner in the inner side, and attached with predetermined mechanism parts to obtain a 3.7-inch floppy disc.

Each floppy disc sample was measured by the following evaluation methods.

Electromagnetic Conversion Characteristics

Output:

A recording operation was performed using a disc tester manufactured by Kokusai Denshi Kogyo Co., Ltd. (the late Tokyo Engineering Co., Ltd.) and Model SK606B Disc Evaluation Apparatus with a metal-in-gap head having a gap length of 0.3 μm, at the position of 24.6 mm in radius and at a recording wavelength of 90 KFCI, and thereafter the reproduction output of a head amplifier was determined by Oscilloscope Model 7633 manufactured by Techtronics Co., Ltd.

SN Ratio:

After DC erasure of the disc used for determining the reproduction output, the reproduction output (noise) was measured by Model TR4171 Spectrum Analyzer manufactured by Advantes Co., Ltd.

SN ratio=−20 log (noise/reproduction output)

Durability:

The durability was tested using a floppy disc drive ("ZIP100", manufactured by Iomega, U.S.A., rotation number: 2,968 rpm). The head was fixed at the position of 38 mm in radius and a recording operation was performed at a recording density of 34 kfci and thereafter the signals thereof were reproduced and taken as 100%.

Thereafter, the disc was run for 1,000 hours in a thermo-cycle environment by taking the following thermo-cycle flow (1) to (8) as one cycle. Every 24-hour running, the output was monitored and when the output became 70% or less of the initial value, the disc was rated NG.

| Thermo-Cycle Flow: | | | |
| --- | --- | --- | --- |
| (1): | 25° C. | 50% RH | 1 hour |
| (2) | | ↓ heating | 2 hours |
| (3) | 60° C. | 20% RH | 7 hours |
| (4) | | ↓ cooling | 2 hours |
| (5) | 25° C. | 50% RH | 1 hour |
| (6) | | ↓ cooling | 2 hours |
| (7): | 5° C. | 10% RH | 7 hours |
| (8) | | ↓ heating to (1) | 2 hours |

Magnetic Property (Hc):

The magnetic property (Hc) was measured using a vibrating sample type magnetometer (manufactured by Toei Kogyo K.K.) at Hm of 10 kOe ($7.95774 \times 10^5$ A/m). Surface Roughness (SRa) by measurement with an optical profiler TOPO-3D:

Same as in Example B-1.

TABLE 3

| | Ferro-magnetic Metal Powder | Magnetic Properties, Hc | | Surface Roughness | S/N Ratio | Dura-bility |
| --- | --- | --- | --- | --- | --- | --- |
| | | (Oe) | ($10^5$ A/m) | (nm) | (dB) | (%) |
| Example C-1 | A-1 | 2375 | 1.89 | 2.6 | 3.5 | 100 |
| Example C-2 | A-2 | 2395 | 1.91 | 2.5 | 3.9 | 100 |
| Example C-3 | A-4 | 2440 | 1.94 | 2.4 | 4.1 | 100 |
| Example C-4 | A-6 | 2370 | 1.89 | 2.2 | 4.4 | 100 |
| Example C-5 | A-7 | 2230 | 1.77 | 2.1 | 4.6 | 100 |
| Comparative Example C-1 | A-8 | 1875 | 1.49 | 2.7 | 0.0 | 100 |
| Comparative Example C-2 | A-9 | 1320 | 1.05 | 2.9 | −3.8 | 100 |

It is seen from Table 1 and Table 3 that in Examples of the present invention, the magnetic layer is smooth and good S/N is obtained, whereas Comparative Examples are inferior in the smoothness of the magnetic layer, the short-wavelength output and S/N.

Fine particulate ferromagnetic metal powders of 100 nm or less have been heretofore very difficult to increase in the as and improve in the demagnetization property, however, according to the present invention, a highly crystalline iron oxide layer having magnetism is provided, so that the ferromagnetic metal particle can be increased in the portion substantially participating in the magnetism and at the same time, favored with reduction in the desensitization during storage at high temperature and high humidity, storage and chemical stability, high Hc, high SQ, excellent SFD and reduced Hc distribution. In turn, the magnetic recording medium comprising this ferromagnetic metal powder can exhibit low noise, high C/N and excellent overwrite properties. This is an excellent magnetic recording medium suitable for use with MR head.

The entire disclosure of each and every foreign patent application from which the benefit of foreign priority has been claimed in the present application is incorporated herein by reference, as if fully set forth.

We claim:

1. A ferromagnetic metal powder comprising:
   a metal portion comprising Fe; and
   an oxide layer around the metal portion,
   wherein said oxide layer comprises a magnetic oxide and a non-magnetic oxide, the magnetic oxide comprising an iron oxide having magnetism such that the saturation magnetization is from 50 to 95 $A.m^2/kg$, and wherein the non-magnetic oxide comprises Y in an amount of 20% by weight (mass) or less based upon Fe.

2. The ferromagnetic metal powder as claimed in claim 1, wherein the metal portion further comprises Co.

3. The ferromagnetic metal powder as claimed in claim 1, which comprises the metal portion, an iron oxide layer, and a nonmagnetic oxide layer, in this order, wherein the iron oxide layer and the nonmagnetic oxide layer define the oxide layer around the metal portion.

4. The ferromagnetic metal powder as claimed in claim 3, which comprises 20 to 96% by volume of the metal portion and 2 to 70% by volume of the iron oxide layer, per one particle.

5. The ferromagnetic metal powder as claimed in claim 1, wherein the ferromagnetic metal powder has a coercivity: Hc of 1,700 to 3,500 Oe ($(1.35$ to $2.79)\times10^5$ A/m) and a saturation magnetization σs: of 100 to 180 $A.m^2/kg$.

6. The ferromagnetic metal powder as claimed in claim 1, wherein the Co content of the ferromagnetic powder is from 10 to 50 atm % based on Fe contained in the ferromagnetic powder.

7. The ferromagnetic metal powder as claimed in claim 1, wherein the iron oxide having magnetism is $CoFe_2O_4$, $CoFe_3O_4$, $\gamma Fe_2O_3$, $Fe_3O_4$, or a Berthollide compound.

8. The ferromagnetic metal powder as claimed in claim 1, which has a saturation magnetization of 100 to 180 $A.m^2/kg$.

9. The ferromagnetic metal powder as claimed in claim 1, wherein the metal portion has an average long diameter of from 25 to 120 nm.

10. The ferromagnetic metal powder as claimed in claim 1, wherein the metal portion has an average acicular ratio of from 3 to 12.

11. The ferromagnetic metal powder as claimed in claim 1, which has an moisture content of 0.01 to 2% by mass.

12. The ferromagnetic metal powder as claimed in claim 1, which has a tap density of 0.2 to 0.8 g/ml.

13. A magnetic recording medium comprising a support having provided thereon a magnetic layer comprising a ferromagnetic metal powder as claimed in claim 1 and a binder.

14. The magnetic recording medium as claimed in claim 13, which further comprises a nonmagnetic layer comprising a nonmagnetic powder and a binder resin between the support and the magnetic layer, and the magnetic layer has a thickness of from 0.01 to 0.5 μm and a central plane average surface roughness of 3.0 nm or less as measured by an optical profiler: TOPO-3D.

* * * * *